United States Patent [19]
Buttke et al.

[11] 3,857,453
[45] Dec. 31, 1974

[54] NOISE SUPPRESSION MEANS FOR TRACTORS

[75] Inventors: Frederic P. Buttke, Peoria; Theodore D. Mathewson, Aurora, both of Ill.

[73] Assignee: Caterpillar Tractor Co., Peoria, Ill.

[22] Filed: Feb. 21, 1974

[21] Appl. No.: 444,316

[52] U.S. Cl............ 180/54 A, 181/33 K, 181/36 D
[51] Int. Cl.............................................. B60k 1/00
[58] Field of Search........ 181/33 K, 36 D, 36 R, 50; 180/54 A, 68 R, 69 R

[56] References Cited
UNITED STATES PATENTS

| | | |
|---|---|---|
| 3,601,101 | 8/1971 | Thien et al..................... 181/33 K X |
| 3,642,092 | 2/1972 | Cederbaum...................... 181/33 K |
| 3,762,489 | 10/1973 | Prosksch et al.................. 181/33 K |
| 3,779,341 | 12/1973 | Huggins............................. 181/50 |

Primary Examiner—Richard B. Wilkinson
Assistant Examiner—John F. Gonzales
Attorney, Agent, or Firm—Phillips, Moore, Weissenberger, Lempio & Strabala

[57] ABSTRACT

A tractor comprises an engine having an enclosure disposed therearound and terminating at its forward end at a radiator guard. A radiator is positioned between the guard and an engine-driven fan which pumps air through the radiator and through openings disposed on lateral sides of the enclosure. A combined air-flow guide and acoustical energy absorption means is mounted between the radiator and the guard.

9 Claims, 3 Drawing Figures

PATENTED DEC 31 1974
3,857,453
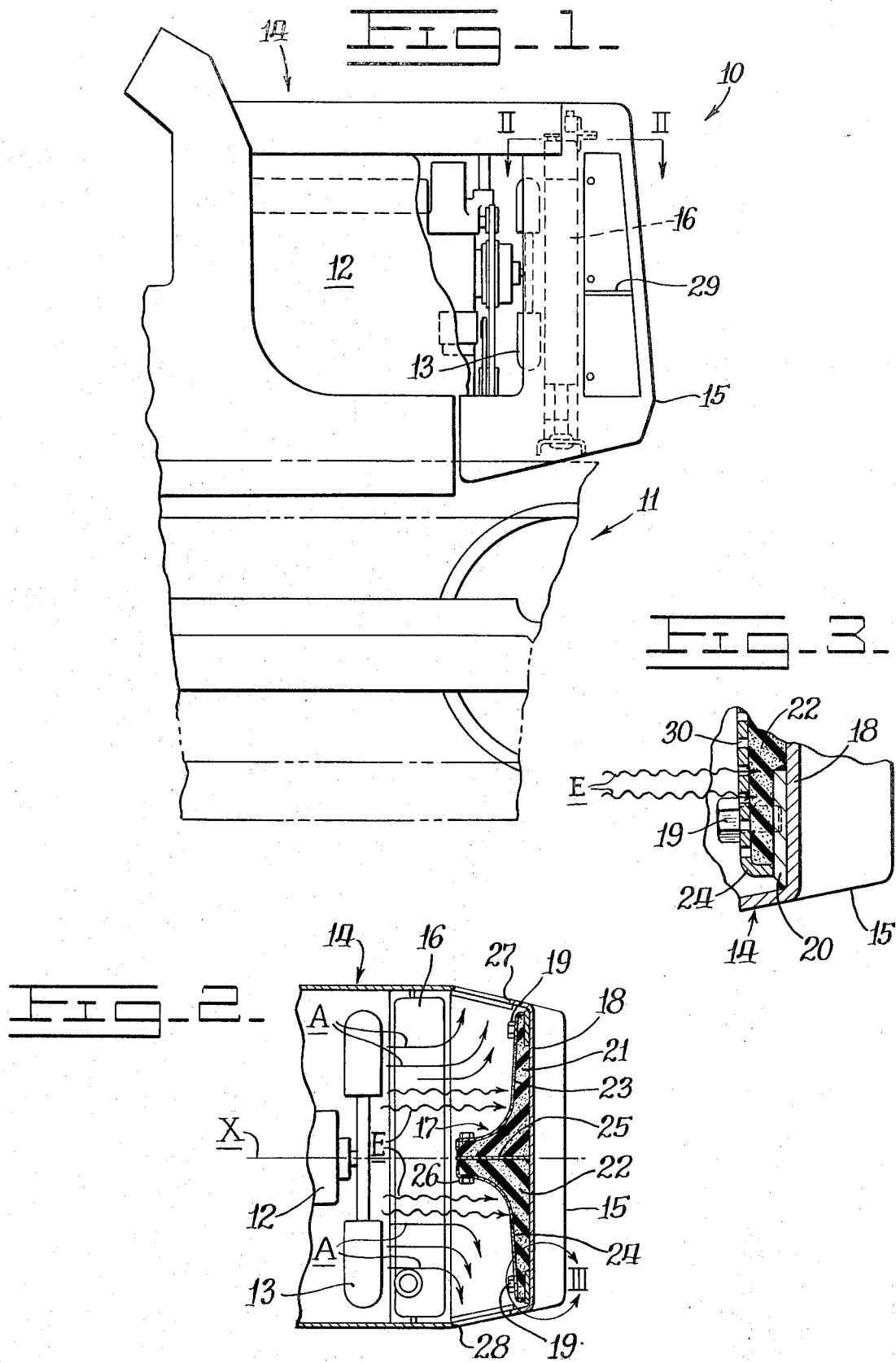

NOISE SUPPRESSION MEANS FOR TRACTORS

BACKGROUND OF THE INVENTION

Conventional track-type tractors normally comprise an internal combustion engine cooled by an air-to-water radiator. An engine driven fan is normally utilized therewith to pump air through the radiator to increase the cooling efficiency thereof. Attempts have been made to suppress the noise level of an engine and associated fan, as exemplified by the solution suggested in U.S. Pat. No. 3,478,958.

SUMMARY OF THIS INVENTION

An object of this invention is to provide a non-complex and economical acoustical energy absorption means for the engine of a mobile vehicle. Such means is disposed between a forward end of the engine and a guard member disposed at a forward end of an enclosure for the engine. In the preferred embodiment of this invention, an engine driven fan and radiator are disposed between the engine and the absorption means whereby air is pumped theretowards during operation of the engine.

BRIEF DESCRIPTION OF THE DRAWINGS

Other objects of this invention will become apparent from the following description and accompanying drawings wherein:

FIG. 1 is a partially sectioned, side elevational view of a front end portion of a track-type tractor;

FIG. 2 is a sectional top plan view taken in the direction of arrows II—II in FIG. 1; and FIG. 3 is an enlarged fragmentary view taken in circle III in FIG. 2.

DETAILED DESCRIPTION

FIG. 1 discloses a front end portion of a track-type tractor 10, mounted for movement on a pair of conventional endless track assemblies 11 (one partially shown). An internal combustion engine 12 is mounted on a frame of the tractor and is adapted to drive an air fan 13 in a conventional manner. An enclosure 14 for the engine terminates at its forward end at a radiator guard 15 which substantially covers the forward end of the engine and an engine cooling means or air-to-water radiator 16.

Referring to FIG. 2, a combined air flow guide and acoustical energy absorption means 17 is attached to an inner plate 18 of guard 15 by a plurality of cap screws 19. As shown in FIG. 3, the cap screws may be threadably mounted on tabs 20, welded or otherwise suitably secured to a back side of plate 18. Means 17 comprises a pair of vertically disposed acoustical members 21 and 22 composed of a standard spongeous rubber or plastic material exhibiting high acoustical energy absorption characteristics. The members are secured in place by a pair of metallic or plastic cover plates 23 and 24, a vertically disposed separating plate 25 and bolts 26 and cap screws 19.

The outer surfaces of the plates are curved laterally outwardly from a longitudinal axis X of the vehicle, towards air outlets 27 and 28 formed through lateral sides of enclosure 14, to induce streamline air flows A. A reinforcing plate 29 may be secured to each side of the enclosure to bridge each of the air outlets, as shown in FIG. 1. As shown in FIGS. 2 and 3, apertures 30 are formed through the cover plates to facilitate the absorption of acoustical energy by members 21 and 22, illustrated by arrows E.

We Claim:

1. A mobile vehicle disposed for movement along a longitudinal axis thereof comprising
   an engine,
   an enclosure for said engine having at least one air outlet formed through a lateral side thereof adjacent to a forward end of said engine and terminating at its forward end at a guard member completely covering a forward end of said engine and
   acoustical energy absorption means extending transversely relative to said axis and disposed between a forward end of said engine and said guard member to completely cover a back side of said guard member and disposed thereon to guide air from said engine towards said air outlet.

2. The vehicle of claim 1 further comprising engine cooling means disposed between said engine and said guard member and an engine driven fan disposed between said engine and said engine cooling means.

3. The vehicle of claim 2 further comprising an air outlet formed through each lateral side of said enclosure, between said absorption means and a radiator, comprising said engine cooling means, disposed adjacent to said engine.

4. The vehicle of claim 1 wherein an outer surface of said absorption means is curved laterally outwardly from a longitudinal axis of said vehicle towards said air outlet to induce streamline airflow therebetween.

5. The vehicle of claim 4 wherein one of said air outlets is formed on each lateral side of said enclosure and a pair of said curved surfaces are formed on the outer surface of said absorption means.

6. The vehicle of claim 1 wherein said absorption means comprises at least one member composed of a spongeous material and at least one cover plate, having a plurality of apertures formed therethrough, securing said member to a back side of said guard.

7. The vehicle of claim 6 wherein a pair of said members and a pair of said cover plates are secured to a back side of said guard member.

8. The vehicle of claim 7 wherein each of said plates are curved laterally outwardly from the longitudinal axis of said vehicle towards an air outlet formed through a respective lateral side of said enclosure.

9. A mobile vehicle comprising
   an engine,
   an enclosure for said engine terminating at its forward end at a guard member at least substantially covering a forward end of said engine and
   acoustical energy absorption means disposed between a forward end of said engine and said guard member, said absorption means comprising a pair of members composed of a spongeous material and a cover plate, having a plurality of apertures formed therethrough, securing each of said members to a back side of said guard, said plates being curved laterally outwardly from a longitudinal axis of said vehicle towards an air outlet formed through a respective lateral side of said enclosure.

* * * * *